United States Patent [19]

Claassen

[11] 4,108,624
[45] Aug. 22, 1978

[54] SUPPORTING A GLASS SHEET FOR PRESS BENDING

[75] Inventor: George Richard Claassen, New Kensington, Pa.

[73] Assignee: PPG Industries, Inc., Pittsburgh, Pa.

[21] Appl. No.: 808,762

[22] Filed: Jun. 22, 1977

[51] Int. Cl.² .............................................. C03B 23/02
[52] U.S. Cl. .................................... 65/273; 65/106; 65/289; 294/119
[58] Field of Search ................. 65/106, 273, 287, 289; 294/118, 119

[56] References Cited

U.S. PATENT DOCUMENTS

| | | | |
|---|---|---|---|
| 2,270,470 | 1/1942 | Paddock | 65/273 X |
| 3,089,727 | 5/1963 | Hay, Jr. | 294/118 |
| 3,256,080 | 6/1966 | Vranken | 65/104 |
| 3,279,906 | 10/1966 | Baker | 65/268 |
| 3,333,935 | 8/1967 | Valchar et al. | 65/106 |
| 3,389,984 | 6/1968 | Englehart et al. | 65/287 |
| 3,512,953 | 5/1970 | Roseman | 65/273 X |
| 3,871,857 | 3/1975 | Claassen | 65/273 |

*Primary Examiner*—Arthur D. Kellogg
*Attorney, Agent, or Firm*—Dennis G. Millman; Edward I. Mates

[57] ABSTRACT

In a mold for press bending glass sheets hung from glass-gripping tongs in which the shaping surfaces have notches along their top edges to provide clearance for the tongs, kinking of the portions of the glass adjacent to the notches during the bending operation is inhibited by providing rigidly mounted tong stop means aligned with the notches so as to force the tongs into a predetermined displacement when the bending molds close.

5 Claims, 3 Drawing Figures

SUPPORTING A GLASS SHEET FOR PRESS BENDING

BACKGROUND OF THE INVENTION

This invention relates to shaping glass sheets and particularly to an improved apparatus for press bending glass sheets into desired shapes. Glass sheets are fabricated into bent shapes for such uses as curved windows for automobiles, motorboats, and other vehicles, as cover windows for instrument panels and television tubes, and other articles, by heating a succession of glass sheets while the latter are conveyed through a furnace of tunnel-like configuration, and removing the sheets one at a time when each sheet in turn has attained its deformation temperature. Each heat softened sheet is engaged between a pair of opposed shaping molds having complementary curvatures conforming to the shape desired for the bent glass sheets. If desired, the bent sheets are tempered by sudden chilling before the temperature is lowered below an elevated temperature suitable for glass tempering immediately following the press bending operation. The present invention is particularly suitable for press bending sheets that are relatively thin. The term "thin", when referring to the thickness of glass sheets for the purposes of this invention, is limited to a maximum thickness of 4.5 millimeters.

Glass sheets are usually gripped near their upper edges by one or more pairs of self-closing tongs during this thermal treatment incidental to press bending and tempering. The tongs are suspended from carriages which are conveyed along a horizontal path of a conveyor that extends lengthwise through the enclosed furnace and the glass shaping station.

During the heating that softens the glass before it is shaped, the tongs provide gripping forces opposing one another through the thickness of the glass sheet. Each glass sheet is normally freely suspended in a vertical plane from the tongs. Normally, more than one pair of tongs is needed to support a flat glass sheet for thermal treatment. The number of tongs depends upon the length and mass of the glass sheet undergoing treatment.

Many devices have been developed to insure that flat glass sheets are properly suspended, usually from a plurality of tongs. Proper loading reduces the likelihood that each tong will apply a twisting force that distorts the glass and imparts a defect known as a kink therein. When a glass sheet is loaded properly, the gripping force applied thereto by each pair of tongs is substantially equal to that applied by each other pair of tongs.

Each pair of tongs exerts a pull in a substantially vertical direction at each glass gripping region gripped by a tong pair. When the glass sheet becomes heat softened, its viscosity is lowered. Its low viscosity at elevated temperatures permits the glass to distort in the vicinity of each gripping region and form a convex bump in the upper edge of the supported glass sheet. The effect of this pull is minimized when the portion of glass weight borne by each pair of tongs is minimized. An optimum condition is obtained when the number of tongs used increases and an equal portion of the glass weight is borne by each tong pair. However, the complexity of loading the glass sheet increases with the number of tongs used. Therefore, a compromise is usually made to limit the number of tongs used to the minimum needed to support the weight of the glass sheet treated and obtain an upper edge distortion within acceptable tolerance limits.

When a plurality of tongs is employed to provide substantially equal gripping forces for tempering flat glass sheets, the defects due to kinking and pulling are reduced substantially. However, the prior art criteria for supporting flat glass sheets probably are insufficient to avoid kinking and pulling when the flat glass sheets are shaped into curved configurations, particularly when gripped by tongs for shaping the sheets about a bending curve having a horizontally disposed axis of curvature.

When glass sheets are bent in such a manner, the upper and lower glass sheet portions are displaced horizontally from the vertical plane occupied by the flat glass. The tongs supporting the upper glass sheet edge portions are rotated out of plumb and pulled into the notched portion of one or the other press bending molds. This movement tends to kink the softened glass because the notched portions provide clearance for tong movement so that each pair of tongs is free to move into the spaces provided by the notched portions while the press bending molds engage the glass sheet while the glass remains softened by heat. Such tong movement meets only modest resistance to movement from the heat-softened glass, which reacts more readily to move into the shape impressed by the molds. Each pair of tongs that is slower to change its position as the press bending molds close against the opposite glass sheet surfaces causes a kink in the glass, particularly when the glass is thin, that is, having a thickness of 4.5 millimeters or less. When glass sheets are bent about vertical axes of bending, the longitudinal end portions of the bent glass sheets are displaced to one side of the vertical plane in which the flat glass is initially suspended from the freely hanging tongs while the central portions are displaced to the other side of said vertical plane. The prior art has suggested disposing two pairs of tongs along the length of the glass sheet at the two locations where the flat glass position is intersected by the curved glass sheets. Such a technique is only suitable for relatively small and light pieces of glass having a mass sustainable by only two pairs of tongs. However, the size of present day glass sheets used in automobiles in such that more than two pairs of tongs are required to minimize tong distortion. Hence, this proposed tong arrangement is suitable only for handling glass sheets of limited size.

Prior to the present invention, a yieldable device was attached to a press bending mold in alignment with and recessed behind its notched portion so as to provide a yieldable device for contacting the glass engaging elements of freely suspended tongs to limit the rate of tong displacement from its plumb line or freely hanging position. This prior art technique was introduced to limit the force the tongs apply against the heat softened glass portions they engage that tend to dimple the engaged portions. Such a spring loaded tong restrictor of the prior art depends on its spring tension to reduce the severity of any tong kinks imparted to the portion of the glass facing the notched portion of the pressing mold. Such spring loaded members that engage the glass-engaging elements of the tongs have been found to be useful with heavier or thicker glass sheets of commercial thicknesses prevalent prior to the present invention. However, the recent energy shortage has provided an impetus for the automotive industry to reduce the weight of automobiles. One method of weight reduction has been accomplished by reducing the thickness of the glass windows included in automobiles. Thus, the spring tensioned members engaging the glass engaging elements of the tongs, which were adequate for use with thicker glass in the past, did not eliminate the glass kinking in the area facing the notched portion of the press bending molding when the need arose to provide shaped glass sheets of thinner dimensions.

DESCRIPTION OF THE PRIOR ART

The idea of providing notched portions in press bending molds to receive tongs which engage glass sheets to be shaped by press bending is old and is disclosed in several patents of which U.S. Pat. No. 2,270,470 to Paddock, U.S. Pat. No. 3,279,906 to Baker, U.S. Pat. No. 3,333,935 to Valchar and Mrozinski, U.S. Pat. No. 3,389,984 to Englehart and Shuster, and U.S. Pat. No. 3,871,857 to Claassen are exemplary.

U.S. Pat. No. 3,089,727 to Hay shows tongs having glass engaging elements shaped in the form of discs. These discs are less likely to mar the glass and penetrate the heated surfaces of the glass during press bending than tongs provided with pointed glass engaging elements of the type depicted in the patents previously enumerated.

U.S. Pat. No. 3,512,953 to Roseman discloses spring loaded members for restricting the free pivoting of glass engaging elements of tongs. The spring loaded members are adjustable in position relative to the shaping surfaces of the corresponding mold and are disposed behind each notched portion of the mold to provide yieldable support for the glass engaging element of the pair of tongs received within the aligned notched portions.

SUMMARY OF THE INVENTION

The present invention provides a non-yielding device or stop member for limiting the precise amount of displacement of the glass engaging elements from the positions they occupy when their associated pairs of tongs are freely suspended. The precise control of the tong movement when the press bending molds engage and shape the heated glass eliminates the tendency of the tong to return to its freely suspended position while the press bending molds engage the heated glass sheet and would induce a kink in the glass portion that faces the aligned notched portions of the press bending molds in the absence of said stop member. An improved stop member of the present invention is located behind each notched portion of a conventional press bending mold into which a freely suspended tong would pivot when the press bending molds engage the opposite major surfaces of the heat softened glass sheet to impress their shape thereon.

The position of each stop member relative to the shaping surface of its associated mold is adjustable. However, once the position of each individual stop member is adjusted, the stop member remains supported rigidly in its adjusted position to limit the motion of the glass engaging elements of the glass sheet supporting tongs during shaping of the glass sheet so that kinking of the glass in the tong gripped portion is substantially eliminated.

In a preferred embodiment of the invention, the stop element for one glass engaging element that engages one major surface of the glass is rigid and a second stop member for the opposite glass engaging element that engages the opposite major surface of the glass sheet is resiliently mounted with respect to the shaping surface of the other press bending mold. The positioning of the resiliently mounted stop member is limited so that sufficient resilience remains to maintain the opposing stop members separated from one another a distance equal to the thickness of the glass sheet plus the dimensions of the glass engaging elements of the pair of tongs in the direction of the glass thickness. This limitation avoids crushing of the glass between the glass engaging elements of the pair of tongs. Such crushing may occur if the stop member engaging the second glass engaging element is not resiliently supported with respect to its associated press bending mold while the first stop member is rigidly supported relative to its associated press bending mold in the exact rigid position required to avoid kinking of the glass into the recessed portion of the latter mold.

The present invention will be better understood from a detailed description of an illustrative preferred embodiment of the present invention and variations thereof that follows.

BRIEF DESCRIPTION OF THE DRAWINGS

In the drawings that form part of the description of preferred embodiments of the present invention, and wherein like reference numbers refer to like structural elements.

DESCRIPTION OF THE PREFERRED EMBODIMENTS

Figure 1:
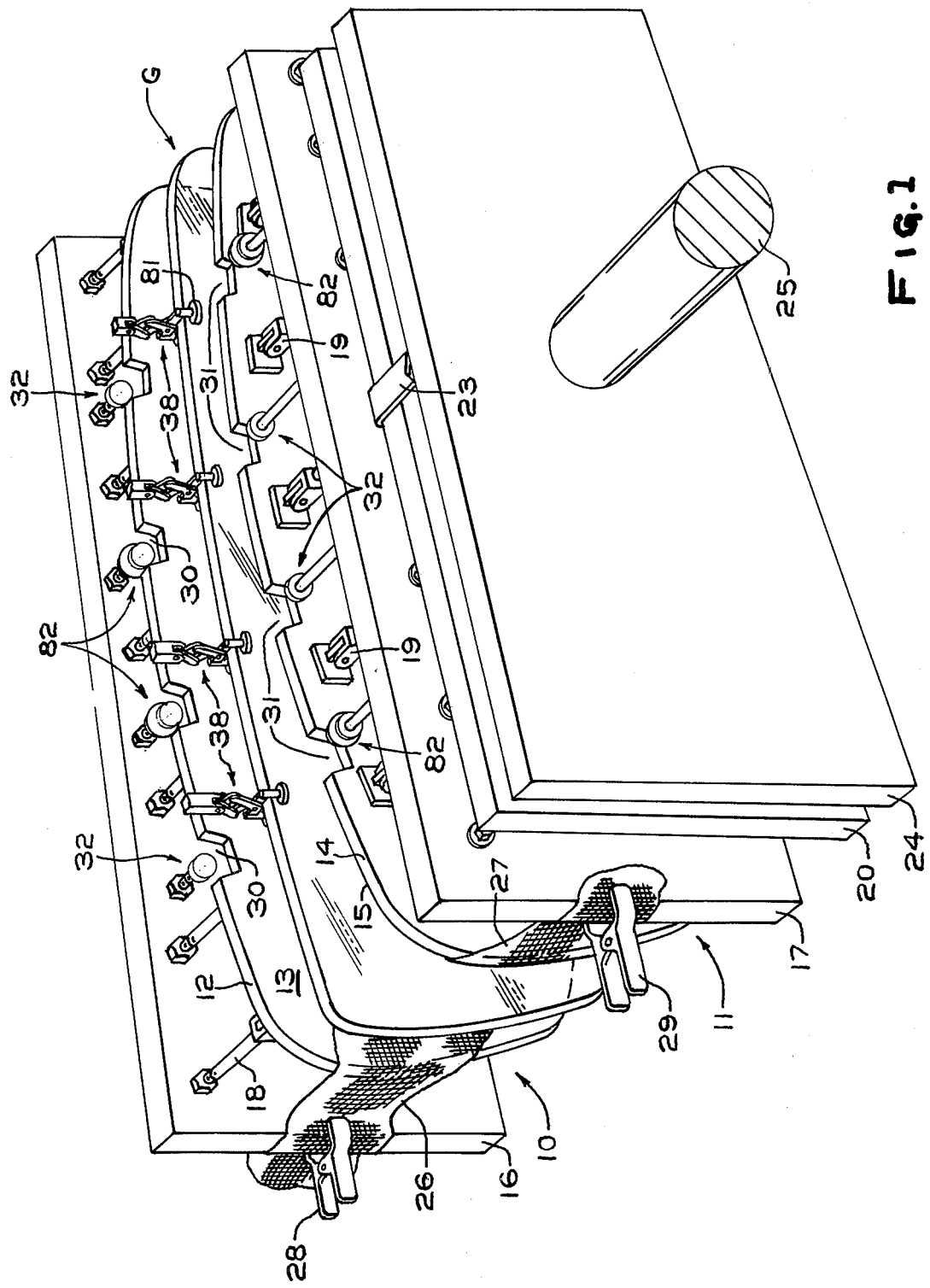
FIG. 1 is an exploded fragmentary view in perspective of a pair of press bending molds in a retracted position, with part of certain structural elements removed to show other elements more clearly and showing the molds provided with several stop members for controlling the positions of the glass engaging elements of tongs according to one embodiment of the present invention in which glass sheets are press bent to shapes around essentially vertical axes of bending.

Illustrative embodiments of glass shaping apparatus of the press bending type according to the present invention comprise a concave shaping mold 10 and a convex shaping mold 11. The molds are provided with shaping surfaces of complementary curvature adapted to engage a heat softened sheet therebetween to impress a shape of desired curvature thereon. A particular pattern of glass sheet press bent by the embodiment of apparatus illustrating the present invention as depicted in FIG. 1 is an automobile backlight that is bent relatively moderately about a horizontally extending longitudinal axis and relatively sharply about transverse axes of curvature that extend essentially vertically adjacent its opposite longitudinal extremities.

Figure 2:
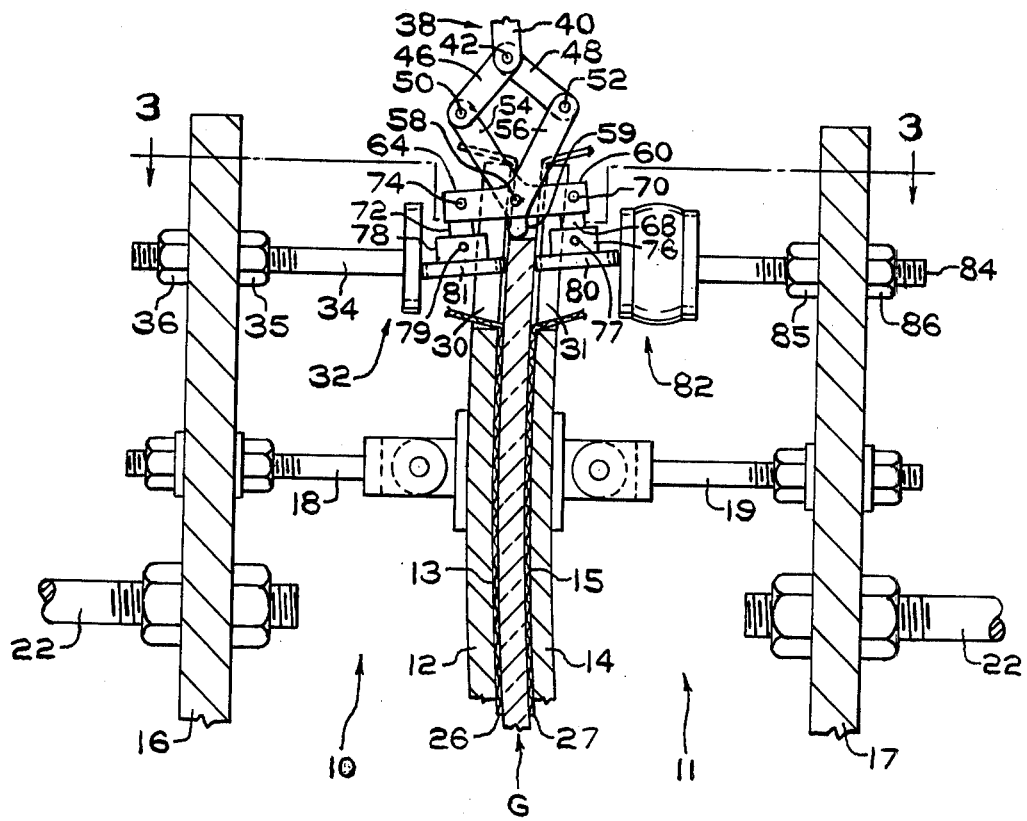
FIG. 2 is a fragmentary sectional view of a different embodiment of press bending molds for shaping glass sheets by press bending to shapes around essentially horizontal axes of bending, showing the molds of this embodiment in the glass engaging position.
Figure 3:
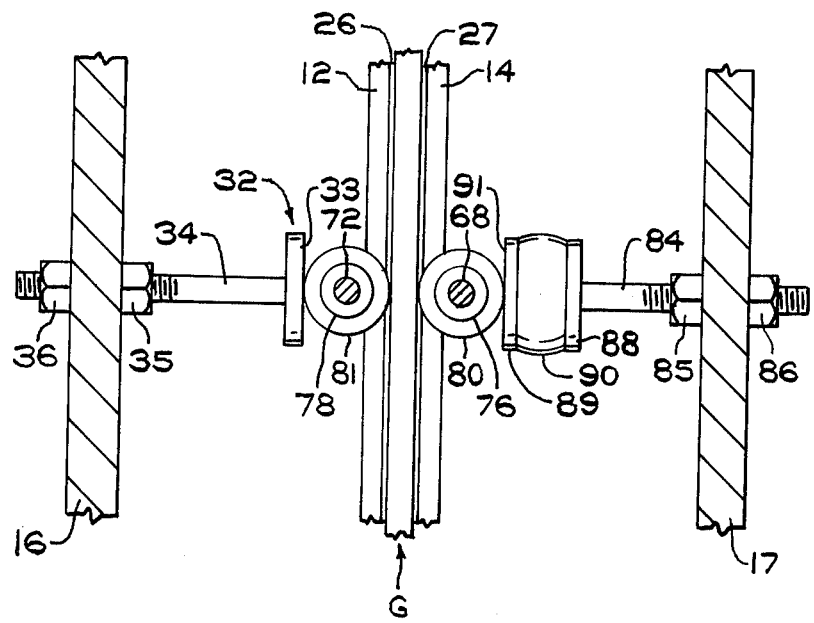
FIG. 3 is a plan view taken along the lines 3—3 of FIG. 2.

The embodiment depicted in FIGS. 2 and 3 shows a typical press bending apparatus for shaping curved automobile sidelights in which the glass is relatively unbent with respect to a transverse axis of bending that extends essentially vertically thereof and is bent in a substantially cylindrical bend about a longitudinal axis that extends essentially horizontally therealong.

In either case, the pairs of tongs, which are self-closing, are forced to tilt from a freely suspended vertically hanging position which they normally occupy when a flat glass sheet is suspended from said tongs. In the case of the FIG. 1 embodiment, the pairs of tongs gripping the longitudinal extremity portions of the glass are pivoted to one side of the initial vertical plane occupied by the flat glass sheet, whereas the intermediate pairs of tongs are pivoted in response to the shaping of the glass to a orientation disposed to the other side of the initial vertical plane. In case the press bending is used to shape curved sidelights where the glass is bent about longitudinal axes extending along an essentially horizontal line, all of the tongs are pivoted in the same direction from their vertical orientation that they assume when they hang freely to grip the flat glass sheet prior to bending. The present invention provides a stop member for each pair of tongs that provides a rigid support for a selected one of each of the aligned pair of notched portions that prevents the associated pair of tongs from pivoting back into the selected notched portion to the freely suspended vertical orientation, which causes the glass to develop kinks in the regions facing the aligned notched portions of the opposed press bending molds.

Referring again to FIG. 1, the concave shaping mold 10 comprises a relatively thin, flexible shaping plate 12 having a front concave surface 13 facing one major surface of a glass sheet G suspended therebetween. The convex shaping mold 11 comprises a relatively thin, flexible shaping plate 14 having a front convex shaping surface 15 facing the opposite major surface of the suspended glass sheet.

Each shaping mold comprises a relatively rigid reinforcement member in the form of a relatively thick metal plate 16 for mold 10 and a similar thick metal plate 17 for mold 11. The relatively thick metal plates 16 and 17 are disposed in spaced relation behind their associated, relatively thin, relatively flexible shaping plate 12 or 14 by a series of jointed attachment means 18 or 19 disposed throughout the extent of the plates and having sufficient losseness at their joints to permit the flexible shaping plates to expand and contract firmly along two axes relative to the rigid reinforcing members or relatively thick metal plates 16 and 17 to which they are attached, in response to the cycles of temperature change encountered in the commercial press bending operation. Additional relatively rigid attachment means are centrally disposed to interconnect the central portions of the shaping plates 12 and 14 to the central portions of the respective reinforcement members 16 and 17 of the respective shaping molds to assure proper alignment and orientation of the shaping molds relative to one another. The press bending molds are generally of the type disclosed in U.S. Pat. No. 3,367,764 to Seymour, the description of which is incorporated herein by reference should the reader be interested in further details of the pressing mold construction.

A rigid back plate 20 is connected in spaced relation behind each rigid reinforcing member 16 or 17 by a plurality of elongated connecting members 22. The back plate is attached to a piston assembly (not shown) by suitable connections 23 to a piston plate 24 attached to the forward end of a piston 25 for moving the press bending molds relative to one another in a manner well known in the art.

The press bending mold 10 is provided with a cover 26 in direct contact with shaping surface 13. A similar cover 27 is provided in direct contact with the shaping surface 15 of press bending mold 11. The covers 26 and 27 are preferably of a material that does not harm glass at elevated temperatures, such as a knit fiberglass cloth composed of textured fibers that have sufficient resiliency and stretchability to conform to the curved shaping surfaces. A superior type of cover for the press bending molds is described and claimed in U.S. Pat. No. 3,148,968 to James H. Cypher and Clement E. Valchar.

A number of hand clamps 28 is mounted about the periphery of each relatively rigid reinforcing member 16 to clamp the cover 26 in position where it is in unwrinkled condition over the shaping surface 13 which it covers. A similar series of clamps 29 is mounted about the periphery of the relatively rigid reinforcing member 17 to secure the cover 27 in unwrinkled condition over the shaping surface 15. The stretchability of the knit covers permit them to have the capability of further yielding if necessary, and yet providing an unwrinkled parting material between each shaping plate 12 and 14 and one of the opposite major surfaces of the glass sheet G when the press bending molds engage the opposite major surfaces of the glass sheet to shape the latter.

Shaping plate 12 of mold 10 is provided with a series of notched portions 30 along the upper edge thereof. Shaping plate 14 of mold 11 is provided with a series of notched portions 31 aligned with each of the notched portions 30 provided along the upper edge of relatively thin flexible shaping plate 12. The notched portions 30 and 31 oppose one another and are aligned in pairs when the press bending molds 10 and 11 engage each softened glass sheet therebetween for press bending.

Behind one or the other of the notched portions 30 or 31, depending upon which way the tongs tilt relative to the free hanging vertical suspension position that they occupy in response to the shaping of the glass sheet between the opposed press bending molds 10 and 11, there is provided a rigid stop member 32. Each of the rigid stop members 32 is provided with a tong element facing surface 33 and is connected to the outer end of a threaded shaft 34. The latter extends through an aperture in its associated relatively thick metal plate 16 or 17 and is secured thereto by a front adjustment nut 35 and a rear adjustment nut 36. The front adjustment nut 35 is threaded to shaft 34 in front of the plate 16 or 17 while the rear adjustment nut 36 is threaded to shaft 34 to the rear of plate 16 or 17. The position of each rigid stop member 32 relative to its associated relatively thick plate 16 or 17 is adjusted in fixed rigid relation by adjusting the positions of the nuts 35 and 36 along the length of the threaded shaft 34.

In order to appreciate the relation of the rigid stop members 32 with respect to each pair of tongs 38, it is necessary to describe the structure of the self-closing tongs 38. A pair of aligned notched portions 30 and 31 is provided for each pair of tongs 38. The number of notched portions 30 and 31 is dependent on the number of pairs of tongs 38 that are needed to support the mass of the glass sheet G that is supported for press bending. During press bending, the glass sheet G is gripped between a pair of glass-engaging elements carried by the bottom portion of each pair of self-closing tongs 38 of the type used to grip glass sheets needed to grip the glass sheet G.

Each pair of tongs 38 comprises an apertured clevis 40 connected to a tongs-supported carriage (not shown). The latter is movably supported on a rail (not shown) which extends in sequence through a heating furnace (where the glass is heated to an elevated temperature sufficient for deformation), a shaping station comprising press bending molds 10 and 11 and a quenching station (where blasts of air or other cooling medium are supplied under pressure to the opposite surfaces of the shaped glass sheets). Since the heating furnace and the quenching station are not part of the present invention, they will not be described in detail.

The aperture in clevis 40 provides a support for a tong support pin 42 which is carried thereby. A pair of upper links 46 and 48 are pivoted to tong support pin 42 at their upper ends. At their bottom ends, links 46 and 48 carry one of a pair of link pins 50 and 52. Tong arms 54 and 56 are apertured at their upper portions to receive one or the other of the link pins 50 and 52. Link pin 50 pivotally attaches the upper portion of tong arm 54 to the lower portion of upper link 46, whereas link pin 52 pivotally secures the lower portion of upper link 48 to the upper portion of tong arm 56.

A common hinge pin 58 pivotally secures tong arms 54 and 56 to each other at their lower portions. In addition, an apertured stop member 59 having a convexly rounded lower edge is pivoted to the common hinge pin 58 between the tong arms 54 and 56 to limit the uppermost position possible for the glass sheet G within the tongs. Further details of this feature and the benefits thereof are found in U.S. Pat. No. 2,991,114 to Robinson, the description of which is incorporated herein by reference.

The bottom portion of tong arm 54 comprises a horizontal extension housing 60 that is vertically apertured. Similarly, the bottom portion of tong arm 56 comprises a horizontal extension housing 64 that is vertically apertured.

A vertical pin 68 is received within the vertical aperture of the extension housing 60. Pin 68 is diametrically apertured with an upper aperture for alignment with a pair of diametrically aligned, horizontal apertures 70 in extension housing 60 and a lower aperture, whose use will be described later. Thus, pin 68 is fixed to extension housing 60 by a cotter key (not shown) extending through the upper aperture of pin 68 and the aligned horizontal apertures 70. A similar diametrically apertured vertical pin 72 is secured to the extension housing 64 by means of a cotter key (not shown) extending through horizontally aligned apertures 74 of extension housing 64 and the upper apertures of pin 72 in a similar manner to that by which pin 68 is secured to extension housing 60.

An apertured sleeve 76 is concentrically mounted about pin 68 below the extension housing 60 and is provided with diametrically aligned apertures 77. Similarly, another apertured sleeve 78 is likewise mounted about pin 72 below the extension housing 64 and is provided with similar diametrically aligned apertures 79. A glass-engaging element 80 of disc-like configuration is concentrically attached to the bottom of sleeve 76. Similarly, an identical glass-engaging element 81, also of disc-like configuration, is concentrically attached to the bottom of sleeve 78.

A pair of cotter pins is adapted to extend through the respective horizontally aligned apertures 77 and 79 of sleeves 76 or 78 and through the lower apertures of the respective vertical pins 68 or 72 to secure the respective sleeves 46 and 48 to the vertical pins 68 and 72. The elements 80 and 81 are concentrically mounted with respect to the supporting sleeves 76 and 78 in such a manner that their convexly curved peripheral portions engage the opposite major surfaces of a glass sheet G to grip the glass sheet G therebetween as the glass sheet G is conveyed through a furnace where it is heated to the glass deformation temperature and then into the shaping station where the heat-softened glass sheet is sandwiched in pressurized engagement between the press bending molds 10 and 11 so that the shaping plates 12 and 14 impress their complementary shapes on the opposite major surfaces of the glass sheets.

As the glass sheets are shaped at the press bending station to the configuration depicted in FIG. 1, some of the pairs of tongs 38 are tilted in one direction relative to the vertical line of free suspension and others are tilted in the other direction. Thus, forces urge the tongs to return to a vertical position where they are freely hung. The stop members 32 are rigidly supported on one or the other thick plates 16 or 17. The positions of the stop members 32 can be adjusted so that they are located within one of the notched portions 30 or 31 a sufficient distance behind the respective shaping surfaces 13 or 15 to provide rigid support for the glass-engaging element 80 or 81 which their tong element facing surface 33 engages in a position that corresponds to the degree of tilt that the corresponding pair of tongs assumes. Specifically, the rigid stop members 32 are located in proper position to provide positive support for the tongs in the position that they occupy after the glass sheet G has been shaped at the shaping or press bending station by adjusting the front adjustment nuts 35 relative to the threaded shafts 34 and then adjusting the rear adjustment nuts 36 to lock the threaded shaft to plate 16 or 17, thereby locking each rigid stop member 32 in its proper position.

The embodiment of FIG. 1 shows an elongated glass sheet supported by four pairs of tongs. The two outer pairs of tongs are pivoted in one direction from the vertical plane in which the flat glass sheet is supported prior to bending and the two intermediate pairs of tongs 38 are pivoted in the opposite direction. For this embodiment, some rigid stop members 32 are provided behind the outermost notched portions 30 of the concave shaping mold 10 and the others are located behind the intermediate notched portions 31 of the convex shaping mold 11.

When molds of the embodiment of FIGS. 2 and 3 are used to press bend glass sheets to form curved automobile sidelights by shaping the glass about a bending axis extending essentially horizontally, all of the pairs of tongs are pivoted in the same direction in response to the shaping of the glass sheet. In this embodiment, all of the notched portions 30 of the concave press bending mold 10 are provided with rigid stop members 32 as depicted in FIGS. 2 and 3. The stop members 32 are each adjustable to a desired fixed position within their respective notched portions 30 in a manner similar to that already described. Such an arrangement provides the necessary support for the glass engaging elements of the tongs when all the pairs of tongs are pivoted in the same direction as a result of the shaping of the glass at the glass shaping station.

While not absolutely necessary, it has been found convenient to provide a resilient stop member 82 behind a notched portion 30 or 31 that opposes a rigid stop member 32 for each of the aligned notched portions of the opposed press bending molds 10 and 11.

Each resilient stop member 82 comprises a threaded shaft 84 similar to threaded shaft 34 that is mounted through an aperture of thick metal plate 17 or 16 and secured thereto by a front adjustment nut 85 and a rear adjustment nut 86. Nuts 85 and 86 operate in a manner similar to the operation of the front and rear adjustment nuts 35 and 36 for the rigid stop member 32.

The resilient stop member 82 comprises a laminated engaging member comprising a rear metal disc 88 and a front metal disc 89 laminated to the opposite sides of a sponge rubber coupling member 90 that provides the resiliency for the resilient stop member 82. The rear surface of the inner metal disc 88 is rigidly secured to threaded shaft 84 and the outer metal disc 89 has an element engaging surface 91 that faces away from the resilient sponge rubber coupling 90. The threaded shafts 34 and 84 are adjusted in position so that the front surface 91 of the front disc 89 is spaced from the front surface 33 of the rigid stop member 32 by a distance equal to the sum total of the diameters of the glass engaging elements 80 and 81 plus the thickness of the glass sheet G. The resilient coupling 90 provides means to permit a slight movement of the front disc 89 away from the rigidly supported stop member 32 in case the thickness of the glass sheet G is greater than the nominal thickness of glass for which the spacing between the opposing rigid stop member 32 and the resilient stop member 82 has been adjusted.

While the apparatus described hereinbefore relate to the press bending and tempering of glass sheets that move along a horizontal path, it is understood that the present invention is also suitable for tongs that grip glass sheets for shaping in apparatus where the glass sheets move in paths other than horizontal. In one example, one or more portions of the path of movement for the glass sheets is oblique to the horizontal path previously described. Also, tongs can be constructed according to the present invention for use in a so-called loft furnace, where the glass moves vertically between one or more successive treatment stations, such as the heating station, the shaping station and the cooling station.

The form of the invention shown and described in this disclosure represents an illustrative preferred embodiment and a modification thereof. It is understood that various other changes may be made without departing from the gist of the invention as defined in the claimed subject matter which follows.

I claim:

1. An apparatus for press bending glass sheets, comprising:
   first and second bending molds having respective first and second opposed complementary shaping surfaces corresponding to the desired shape for the glass sheets;
   means for reciprocating the bending molds toward each other so as to press a heat-softened glass sheet vertically hung from tongs between the shaping surfaces into a shape in which a lower end of at least one set of tongs is tilted from its vertically hanging position toward the first shaping surface;
   a first notch in the upper edge of the first shaping surface and a second notch in the upper edge of the second shaping surface, said notches being aligned with each other so as to receive a lower end portion of said tilting tong set when the shaping surfaces engage a glass sheet; and
   tong stop means including a tong contacting surface behind the second shaping surface horizontally aligned with and facing the second notch, and means for rigidly mounting the tong contacting surface onto the second bending mold at a distance behind the second notch sufficient to come into non-yielding contact with a lower end portion of said tilting tong set as the portions of the shaping surface around the second notch come into engagement with a glass sheet and to limit the degree to which the tilting tong set may return toward its freely hanging vertical position.

2. An apparatus as in claim 1 wherein each shaping surface includes a plurality of tong-receiving notches in its upper edge aligned with the notches in the opposite shaping surface, further including a plurality of said tong stop means each located behind and aligned with one of said notches.

3. An apparatus as in claim 2 wherein one of the shaping surfaces is concave and the other of the shaping surfaces is convex, at least one of said tong stop means is located behind and aligned with a notch in the center portion of the top edge of the convex shaping surface, and at least one of said tong stop means is located behind and aligned with a notch in the end portions of the top edge of the concave shaping surface.

4. An apparatus as in claim 1 further comprising a secondary tong stop means spaced behind and aligned with the notch opposite the notch associated with the rigid tong stop means, the secondary tong stop means including a tong-contacting surface and means resiliently mounting the tong-contacting surface onto the bending mold opposite the bending mold carrying the rigid tong stop means.

5. An apparatus as in claim 3 further comprising at least one secondary tong stop means each spaced behind and aligned with a notch opposite one of the notches having one of the rigid tong stop means associated therewith, each of the secondary tong stop means including a tong-contacting surface and means resiliently mounting the tong-contacting surface onto the bending mold opposite the bending mold carrying said associated rigid tong stop means.

* * * * *